United States Patent Office 3,425,363
Patented Feb. 4, 1969

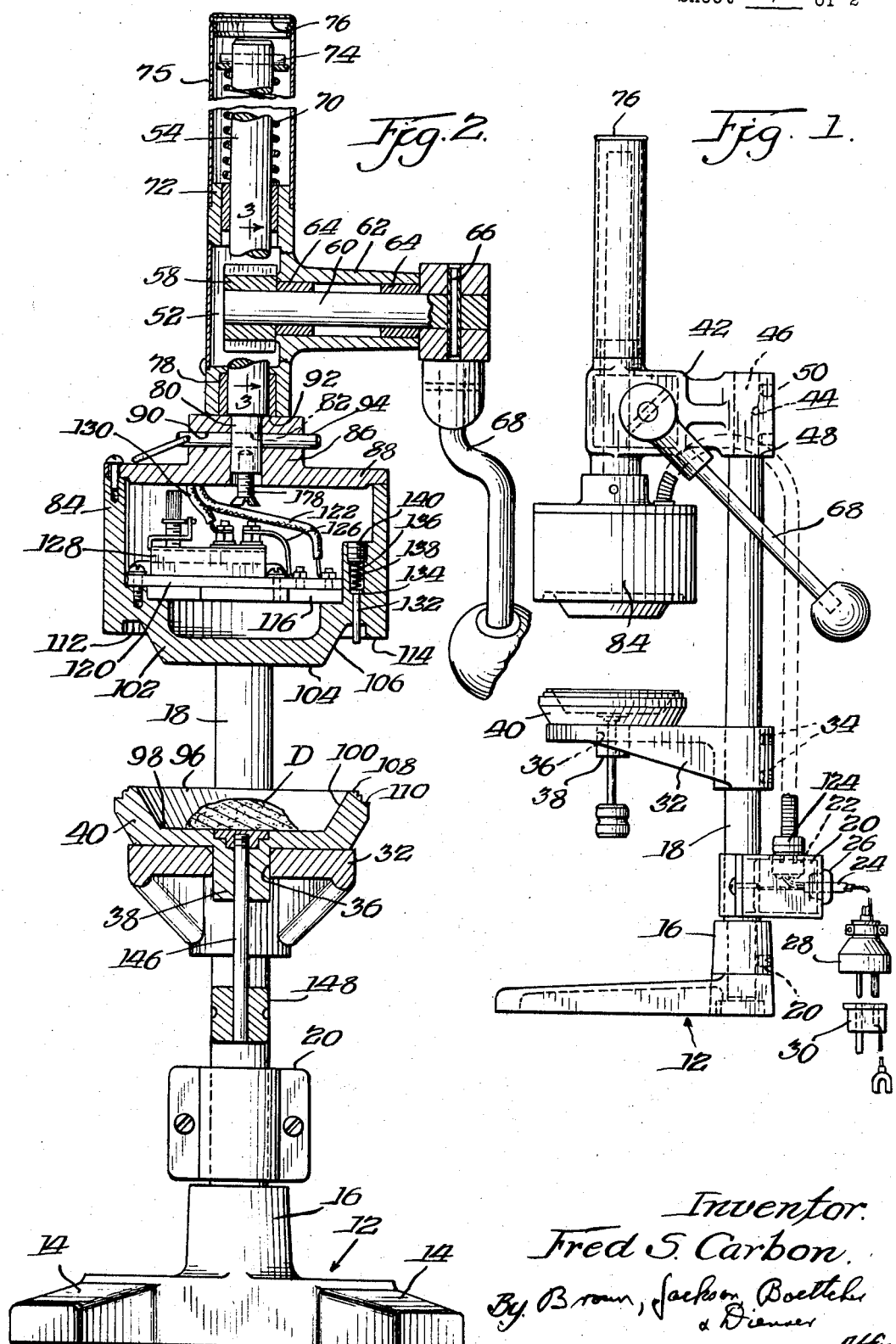

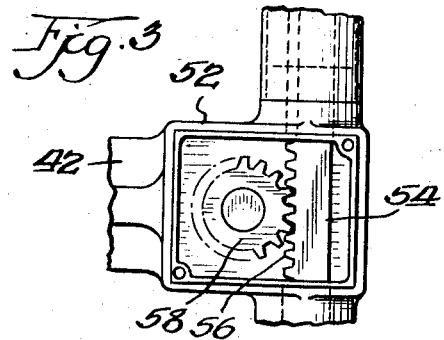
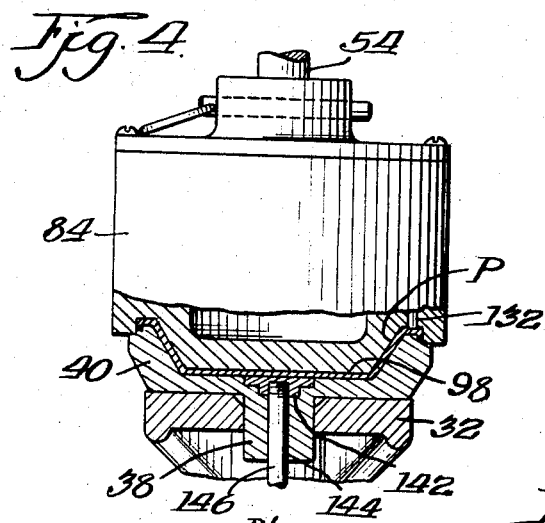
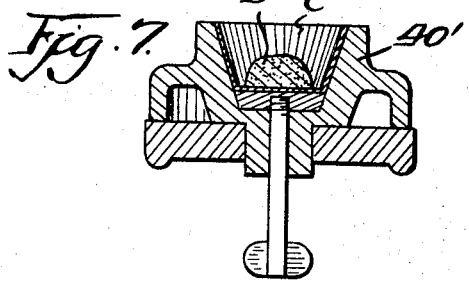
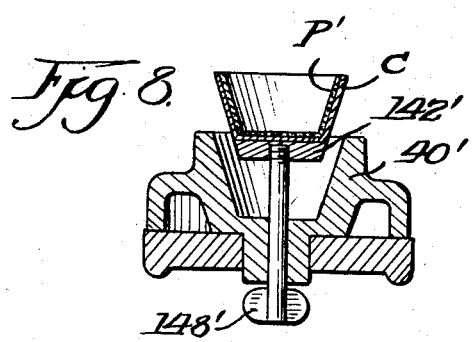
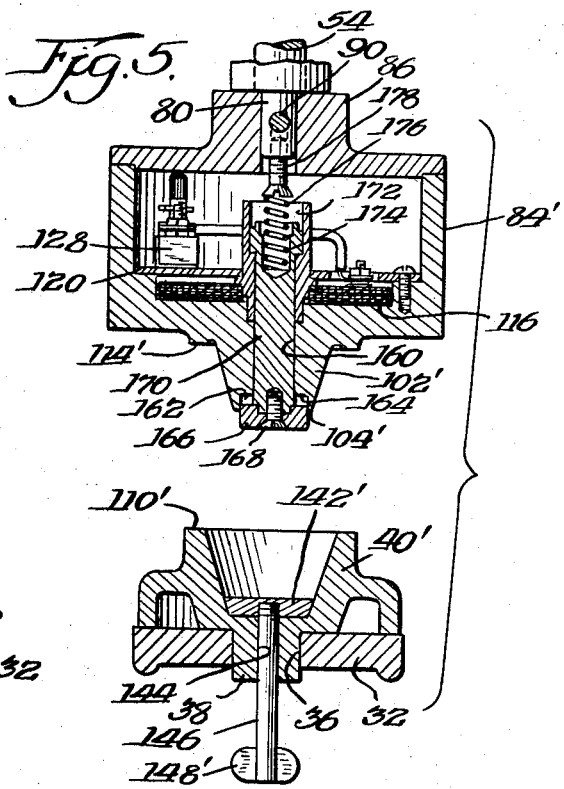

3,425,363
PASTRY SHELL PRESS
Fred S. Carbon, Buchanan, Mich. 49107
Filed May 24, 1965, Ser. No. 457,912
U.S. Cl. 107—15                          3 Claims
Int. Cl. A21c *11/00*; A23g

ABSTRACT OF THE DISCLOSURE

A pastry shell press having a cavital die which receives the pastry dough and a cooperating movable die having a dough contacting surface which is heated to a thermostatically controlled temperature, high enough to superficially dry the surface of the dough contacted thereby as it is momentarily pressed to shape, the drying being sufficient to avoid sticking of the dough to the movable die surface, and the cavital die having a movable end wall which is operable to eject the pressed shell therefrom.

---

This invention relates to pastry shell presses.

In accordance with this invention, a pastry shell press comprises a pair of cooperating dies supported on a stand in aligned vertical relation, the lower die having an appropriately shaped cavity in which a piece of pastry dough is placed and the upper die being movably mounted on the stand so that it may be forced downwardly into cooperating relation with the lower die cavity so as to press the dough piece between the two dies into a pastry shell of the required shape.

A major problem of using cooperating dies to press the dough into shell form is the tendency of the formed pastry shell to stick to the upper or movable one of the cooperating dies on its withdrawal from the lower die cavity. It is, however, a feature of this invention that I provide means by which the pastry dough is simultaneously heated as it is pressed into shape between the two dies to effect a superficial baking or drying out of the surfaces of the pressed pastry shell so that the dough loses its adhesive character and does not stick to the die surfaces. Additionally I provide means in the form of plural spaced fingers, or a plate, on the movable one of the dies so adapted as to engage the pastry shell on the down stroke of the upper die and to be resiliently displaced longitudinally of the die movement sufficiently that on the withdrawal stroke of the die the withdrawal of the fingers or plate is momentarily delayed and in which moment said fingers or plate act to hold the formed pastry shell in the lower die cavity as the upper die is raised therefrom.

Thus it is a principal object of my invention to provide a pastry shell press in which the movable one of its two cooperating forming dies is heated above the temperature of the dough pieces being pressed and is also provided with means which momentarily exert a separating force on the pressed pastry shell as the movable die is withdrawn whereby a clean and completely satisfactory separation or release of the die from the pressed pastry shell is assured.

Also, and it is a further feature of my invention to provide the lower die of such a pastry shell press with an externally-operated lift portion in the bottom wall of its cavity by which I am able to raise the formed pastry shell out of the lower die cavity to eject the same from the die cavity.

Another and important feature of my invention, is that I provide the pie shell pressing dies with additional portions or means which both shape and/or trim the pressed dough at the edges of the formed pastry shell and otherwise control the mating of the dies so that the dough pieces can be regularly pressed to consistent and predictable wall thicknesses and dimensions in a repetitive operation.

Still another feature of my invention is that the die supporting structure of my press is so adapted that the dies can be quickly and conveniently set in position on the press stand and removed. This provides the advantage that one press may be used with interchangeable dies to permit pressing pastry shells of different diameters and/or shapes. For example, one set of dies may be provided to press dough pieces into 7 inch pie shells and another set of dies interchangeable therewith to press dough pieces into 2 or 3 inch tart shells.

It is still a further but important feature and/or object of the invention that all of the aforesaid features characterizing my pastry shell press are obtainable in a structure which is not only simple in its construction and therefore economical to manufacture but also convenient and facile in its operation.

Many other objects, advantages and/or features of the invention in a pastry shell press will suggest themselves, be at once evident or will become so upon consideration of the accompanying drawings which illustrate preferred forms of the invention and the description thereof which follows:

Referring therefore to the drawings:

FIGURE 1 is a side elevational view, of one form of a pastry shell press embodying the invention;

FIGURE 2 is a vertical section view taken therethrough to show details in its construction and assembly of the dies which are illustrated in their open position to receive a fresh dough piece for pressing and/or to facilitate ejection of a pressed pastry shell.

FIGURE 3 is a vertical sectional view taken along lines 3—3 of FIGURE 2 looking in the direction indicated by the arrows and illustrates the gear and rack arrangement used to raise and lower the upper die into and out of its pressing relation with the lower die cavity;

FIGURE 4 is a fragmented view, partly in section, which illustrates the closed position of the two dies and shows the dough piece pressed to shape;

FIGURE 5 is a vertical section view generally similar to FIGURE 2, although more fragmented, and shows an alternate construction of upper and lower dies;

FIGURE 6 is a sectional view of the lower die with a crinkle cup and piece of pastry dough positioned therein for pressing into a tart shell;

FIGURE 7 is a fragmented, partly sectional view of the two dies of FIGURE 5 showing them in closed position and with the dough piece pressed into the walls of the crinkle cup and to the shape defined by the dies; and FIGURE 8 is a view similar to FIGURE 6 and illustrates the lift portion in the manner of ejecting the crinkle cup enclosed pastry shell after withdrawal of the upper die from the cavity of the lower die.

Referring now more specifically to the several views where it is to be understood like parts are identified by like reference numerals and first to FIGURES 1 through 4, the invention is illustrated comprising a stand indicated generally at 10 embodying a base or pedestal 12 having a pair of divergent forwardly extending feet 14 and a rearward located boss 16 having a vertical bore in which the lower end of vertically extending supporting shaft 18 is secured against rotation as by set screw 20. Secured about supporting shaft 18 immediately above boss 16 is a junction box 20 containing a female convenience plug 22 which may be of the "twist lock" type. Plug 22 is located in the top wall of junction box 20 behind shaft 18 and is adapted for electrical connection to a 110–120 volt AC or other appropriate power source as by power cord 24 which extends through bushing 26 in the rear wall of the junction box and terminates in male plug 28. Preferably power cord 24 will be of the three wire type, female plug 22 being provided with three receptacles and male plug 28 with three prongs, one of which is adapted to be grounded through employment of an adapter 30 which is detachably connected to a service outlet in the conventional manner as is well known to those skilled in the electrical art. However, if desired and permitted by the locally enforced electrical code, a two wire type of power cord may be used, female plug 22 and male plug 28 in this case being of corresponding two receptacle and two pronged construction.

At 32 is a horizontally disposed supporting arm or plate having a vertical bore in its rear and through which a shaft 18 extends and on which shaft it is held in place by set screws 34. Near its forward end plate 32 is provided with a second cylindrical bore 36 through which extends depending cylindrical portion 38 of the lower die 40 removably seated on the top horizontal surface of said plate 32 about bore 38.

At 42 is a second horizontally disposed supporting arm having a vertical bore 44 fitting about the upper end 46 of shaft 18, which end is of reduced diameter to provide a shoulder 48 on which arm 42 rests. Set screws 50 serve to hold arm 42 in aligned relation with the lower die supporting arm 32 and prevent its turning about end 46. As illustrated best in FIGURES 2 and 3, the forward end of arm 42 comprises a gear box 52 containing a pinion gear 58 having teeth which mesh with the teeth of vertically steady rack 54 mounted for reciprocal vertical movement through bore 56 with rotation of pinion gear 58. Pinion gear 58 is supported on the end of shaft 60 which is rotatably supported within horizontal extension 62 by a pair of spaced bushings 64. The outer end of gear shaft 60 protrudes from extension 62 and is pinned at 66 to a lever arm 68 which may be manually operated to raise and lower rack 54 through bore 56. Encircling rack 52 is a compressible helical spring 70 confined between bushing 72 forcefitted in the top end of vertical bore 56 of gear box 52 and abutment pin 74 horizontally extended through the top end rack 54. Mounted on gear box 52 and so as to enclose rack 54 and encircling helical spring 70 is a cylindrical cover tube 74 having a plug 76 along the upper end thereof.

Rack 54 is slidably supported within bore 56 by previously mentioned upper bushing 72 and a second lower bushing 78 and terminates in an end portion 80 of reduced diameter provided with a horizontally disposed through bore 82. Reduced end 80 serves as a mount to which an upper die indicated generally at 84 is removably connected. As shown in FIGURE 2 upper die 84 is hollow and includes a cover 88 having an upstanding boss portion 86 provided with a bore of a diameter to receive reduced end 80 of rack 54. It also has a horizontally disposed through bore 90 alignable with through bore 82 in the reduced rack end 80 to receive lock pin 94 when boss 86 is abutted against shoulder 92, the upper die 84 being thus removably attached to rack 54.

Turning now to FIGURE 2, the essential features of lower die 40 and upper die 84 between which pastry dough piece D is pressed to the shape of a pastry shell P (FIGURE 4) will be described. As shown, lower die 40 comprises a molding cavity 96 having a circular shaped flat bottom wall 98 and a surrounding conical shaped side wall 100 which, together determine the external surface shape of the pastry shell into which pastry dough D is pressed. Upper die 84 on the other hand includes a male or projecting portion 102 having a circular-shaped flat bottom wall 104 and a surrounding conical shaped side wall 106 which impart the required internal shape of the pastry shell when pressed into cavity 96 forcing the dough D to flow and conform to the shape of the cavity and projection walls between which it is pressed. Lower die is also formed with an inner annular substantially horizontal molding surface 108 adjacent its conical wall 106 and an outer substantially horizontally disposed recessed annular abutment surface 110. Upper die 84 also is provided with an inner horizontally disposed annular shaped molding surface 112 aligned with the inner annular surface 108 of the lower die and a surrounding depending rim defining an outer horizontally disposed annular abutment 114 which abuts annular surface 110 of the lower die 40 in the closed position of the two dies (FIGURE 4).

Referring now to FIGURE 1, it will be appreciated that by raising handle 68 upwardly, forwardly and downwardly in a counterclockwise rotary movement rack 54 through its engagement with gear 58 will move downwardly against the force of the resistance of spring 70, carrying projection 102 of the upper die 84 into cavity 96 of the lower die 40 until halted by the engagement of annular abutment surface 110 of the lower die 40. As illustrated in FIGURE 4 annular abutment surfaces 110 and 114 are related to the axial depth of cavity 96 and projection 102 of the two dies, and also annular surfaces 108, 112 to define the wall thickness of the shell into which pastry dough piece D is pressed between the walls 98, 100, of the lower die cavity 96 and walls 104 and 106 of the upper die projection portion 102 and its crust between annular surfaces 108 and 112. Assuming the dough piece D to be of a measured quantity and sufficiently great to fill the space left between said surfaces 98, 100, 108 of the lower die and surfaces 104, 106, 112 of the upper die the press will be useful to press pie shell P to the same uniform and consistent wall thickness every time. The outer annular portion 114 of the upper die 84 also acts as a dam or trimmer to cut off excess dough material which may be forced out between said surfaces of the two dies and over the peripheral edges of the lower die 40. This, however, will occur only when an excessively large size of dough piece D is placed in the cavity of the lower die and which will normally be avoided. Once the dough piece has been pressed into the desired pie shell form by the lowering of die 84 until limited by engagement of its abutting surface 114 with surface 10 of the lower die, die 84 may be relieved to its open position illustrated in FIGURES 1 and 2 by raising lever arm 68 and rotating it in a clockwide rotating movement assisted by the now expanding spring 70 to its initial position.

Preferably the two molds 40 and 84 will be formed of stainless steel or other suitable metal having a smooth surface to which the dough does not readily adhere. I, however, have found that advantageously the upper die 84 and particularly its projecting portion 102 should be heated to above the temperature of the dough and sufficiently high that in the momentary engagement of its projection 102 with the dough in the pressing act, the contacted surface of the dough will be sufficiently heated as to harden or dry to a superficial depth. By this means the surface of the pie shell P is sufficiently dried that it loses its adhesive character and tendency to stick to the surface of the projection 102 which has been pressed thereon when shaping the dough to a pie shell. I have found that by maintaining the temperature of the projection portion 102 of the upper die 84 at a temperature near 240° F., only momentary contact of heated projection 102 with the surface of the pressed pie shell P is sufficient to dry its surface to a texture substantially free of adhesion to the surface of the projection 102 and also that there has been sufficient preliminary cooking or baking of the pie shell P that it will retain its shape when afterwards removed from the lower die 40 and is ready for filling and/or baking without further support as by a pie pan.

Heating of projection 102 is obtained by heating element 116 disposed within the hollow of upper die 84 on provided shelf 118 and secured thereto by hold down bar 120 which is fastened to the body of die 84 by screws spaced at appropriate intervals. One end of the resistance heating element 116 is electrically connected by wire 122 to one prong of male plug 124, the other end of the resistance heating element 116 being connected by wire 126 to one side of an adjustably set thermostatically controlled switch 128 appropriately mounted within the hollow of die 84 on supporting hold down bar 120. Thermostat 128 of conventional construction, for example, comprising a pair of make and break contacts one of which being movable and under the influence of a bimetallic element. The details and the construction of the thermostat however are not essential to an understanding of the present invention and are, therefore, not more specifically described or illustrated. Wire 130 connects the other side of the thermostat 128 to a second prong in male plug 124. As shown in FIGURE 1, male plug 124 is adapted for detachable electrical connection with female plug 22 in junction box 20 and the two wires 122 and 130 together with an appropriately connected ground wire are shielded with insulation material and together comprise a flexible cable of sufficient length and looped, as illustrated in FIGURE 1, to accommodate the previously described reciprocal vertical movement required the upper die 84.

In addition, it is a feature of the invention that I provide means which temporarily engage the pressed pastry shell as the movable die is withdrawn to complete the severance therefrom. In the embodiment of FIGURES 1–4 this means comprises a plurality of spaced pins 132 arranged at appropriate intervals in provided recesses to protrude through surface 112 of the upper die 84. These pins 132, preferably comprising three or four in number, although only one of which is visible in FIGURE 2, include a headed portion 134 resting on a provided shoulder at the base of bore 136 backed by a spring 138 contained in said bore and the tension of which is adjustable by screw 140 when the dies occupy their open position illustrated in FIGURE 2. However, as the dies are brought together to effect a pressing of the dough piece D into pastry shell P, the lower ends thereof are brought into engagement with the upper surface of the formed crust, which resists further downward movement of the pins 132 and so that springs 136 are compressed between headed portion 134 of the pin and screw 140. Screws 140 are previously adjusted so that the tension set up in springs 136 is not sufficient to cause pins 132 to pierce the pie shell crust and they remain in engagement against the top surface of the pie shell edge crust. Upon withdrawal of die 84 and its projection 102 from cavity 96 of the lower die 40 pins 132 remain in engagement with the pie shell under the force of the springs 136 now being relieved and until die 84 has been raised to a sufficient height where again head 134 of the pins rests on the shoulder provided therefore at the base of bores 136. The temporary force thus exerted by the pins on the edge crust of the pie shell P assures a clean separation of projection 102 from the pie shell which is therefore retained within cavity 96 of die 40. Although as thus far described pins 132 have been considered as having their lower ends squared off or planar. However their lower ends may also be given a rounded or conical, tapered shape if marking or piercing the edge crust of the pressed pastry shells is not objectionable. The end surface of pins 132 when thus reshaped will still provide temporary resistance to the pressed pastry shell P rising with the upper die 84 as it is withdrawn, since at least some portion of the end surfaces of the pins will nevertheless overlying engage the pressed dough although the apex of said end surface may have partially or completely preheated the wall of the pastry shell. In this alternate construction of the pins the tension adjustment of springs 138 will be less critical.

Turning now more particularly to the lower die 40, as illustrated in FIGURES 2 and 4, the bottom wall of its cavity includes a plug or lift plate 142 seated in a provided recess so that its upper surface is flush with the surrounding bottom wall surface of the lower die cavity 96. Communicating with said recess is a central bore 144 through cylindrical portion 38 of the lower die 40 to permit reciprocal movement of stem 146 shows threaded into the under side of lift plate 142 and also provided with a handle at its lower end (FIGURE 2). After dough piece D has been pressed to the illustrated pie shell P (FIGURE 4) and the upper die 84 returned to its raised position the pie shell may be raised out of the cavity in lower die 40 by manually grasping handle 148 on pin 146 and lifting. As previously described, I have found that the momentary heating of the pie shell during its contact with the heated projection 102 of the upper die 84 provides a sufficient set to the pie shell P and a superficial drying of its surfaces that it readily separates from the walls of cavity 96 and lift plate 142 without sticking. In addition, where the pressed pastry shell is of the illustrated conventional shallow pie form, it is also sufficiently shape retaining as to hold its shape upon removal from cavity 96 of the lower die 40 and may be immediately placed in the oven for baking or first filled without the necessity of being placed in a baking dish. It may also be stored without further reinforcement until filled and/or baked. However, if desired, cavity 96 of the lower die 40 may be first lined or provided with an aluminum foil dish and/or other utensil and then loaded with dough piece D so that the pie shell is actually pressed to shape in the utensil in which it is to be eventually baked.

It will be further understood that, although cavity 96 and projection 102 are shown and described as having a circular configuration to which form pastry shells are conventionally shaped, they may be also given any other shape, rectangular, square, oval or the like. In the event pastry shells of non circular form are to be pressed it will be important that projection 102 of the upper die be accurately aligned with cavity 96 of the lower die 40. It will be appreciated, however, that in accordance with the present invention locking pin 94 serves to locate the upper die and its projection 102 in a fixed position, whereas the lower die 40 and its cavity 96 are free to turn on the vertical axis of its cylindrical portion 38 as supported in bore 36 of supporting arm 32. Consequently, it is a relatively simple matter to locate cavity 96 and projection 102 in alignment. Furthermore, it will be recognized that because die 40 is freely turnable in bore 36, its cavity 96 is essentially self-aligning with projection 102. By this is meant that where projection 102 and cavity 96 of the two dies are non-circular in shape and the lower die is turned slightly out of alignment, as die 84 is lowered and projection 102 enters cavity 96 of die 40, die 40 will rotate slightly on its axis to accommodate the entrance of the projection 102 and so obtain the proper and required alignment therewith.

It will be further recognized that because the two dies are readily and conveniently detachable from their mount on supporting arm 32 and the lower end of rack 54, a pastry shell press in accordance with the invention may be conveniently used with a plurality of interchangeable sets of upper and lower dies to accommodate the press operator's requirement for pressing different shapes and/or sizes of pastry shells. To briefly review, one set of dies may be readily removed and replaced by a second set by first locating the dies in their open position in the press as illustrated in FIGURE 1. The upper die 84 is first separated from end 80 or rack 54 by pulling on bail 94a to remove lockpin 94 which allows die 84 to slide off the end 80 of the rack 54 by the forced gravity. Plug 124 is then disconnected from female plug 22 in the top of junction box 20. Next the lower die 40 is removed by raising it off its seat on supporting arm 32 to move its portion 38 from bore 36, the diameter of handle 148 being purposely less than that of bore of 36 to accommodate this action. With the two dies thus removed, a new set may be placed in position by first locating the lower die of the new set in position on arm 32 with its portion 38 in bore 36 and then fitting the boss of the upper die over the reduced end 80 of rack 54 and inserting lockpin 94 through the aligned bores 82 and 90 of said boss and rack end.

Referring now to FIGURES 5 through 8, a modified construction of pastry shell pressing dies is illustrated, which dies are however also adapted for attachment to stand 10 of the press illustrated in FIGURES 1 and 2. As illustrated in FIGURE 5, in this embodiment the lower die 40' has a cavity 96' and the upper die 84' has a projection 102' of generally similar shape and function as the corresponding cavity and projection of dies 40 and 84. However they have a contemplated use for press shaping dough pieces into tart shells and so have a depth more nearly equal to their width or diameter than did the cavity and projection of the dies in the first embodiment; the dimensions of which indicated a use for press shaping dough pieces into relatively large-diametered and shallow pie shells. Conventionally tarts are baked within so called crinkled paper cups, and as shown in FIGURE 6, the cavity 96' of the lower die 40' of this embodiment is therefore initially loaded with a crinkle cup C containing a piece of pastry dough D' which will be pressed within the crinkle cup to the desired shell shape. As illustrated in FIGURE 5, projection 102' of the upper die 84' of this embodiment and cavity 96' of the lower die 40' have similarly shaped flat bottom walls and surrounding conical shaped side walls. They also are provided with surrounding annular abutment surfaces 110' and 114' which come together during the pressing act to limit the downward movement of die 84 and so control the wall thickness of the tart shell to which the dough piece is pressed. Since tarts do not have an edge crust, the inner annular molding surfaces 112 and 108 of the first described embodiment have no counterparts in dies 40' and 84'. Lower die 40' is provided however with a locating cylindrical portion 38 depending centrally from its underside which seats in bore 36 of the supporting horizontal arm 32 of the previously described stand of FIGURE 1. Upper die 84' also includes a boss 86 having a bore into which is received reduced end 80 of rack 54 and also a through bore 90 which is aligned with the through bore 82 in said rack end 80 to permit insertion of lockpin 94 to receive die 84' thereto. Upper die 84' is similarly provided with a resistance heating element 116 held in place by hold down bar 120 and on which is supported the previously described thermostat 128, the heating element and thermostat being similarly wired to a male plug 124 which is adapted for electrical connection with female plug 22 in the top of junction box 20 as previously described in connection with the first embodiment. In this embodiment therefore, the upper die 84' is also heated to a thermostatically controlled temperature of about 240° F. However, the means employed to temporarily hold the pressed pastry shell within the cavity 96' of the lower die 40' as the upper die 84' is raised after the pressing act to assure a clean separation of its projection 102' from the pressed tart shell P is somewhat different although in its function essentially the same. Referring therefore to FIGURE 5, and considering also FIGURE 7, it will be seen that projection 102' is provided with a vertically extending bore 160 which communicates with a recess 162 of larger diameter in the bottom wall 104' of the projection 102' and provides an annular shoulder at 164. Seating in said recess 162 is a push plate 166 attached by any appropriate means, as for example screw 168, to the end of push rod 170, which is adapted for reciprocal movement in bore 160. The upper end of push rod 170 contains a spring 176 which is confined between the base of bore 180 which contains spring 176 and the head of a screw 178 adjustably threaded within the end of reduced end 80 of rack 54 and which the upper end of said spring 176 engages. On the downstroke of die 84' push plate 166 is spaced below shoulder 164, but not out of recess 162, an amount limited by engagement of abutment 172 on rod 170 with surrounding shoulder 174. However as projection 102' enters cavity 96, the underside of push plate 166 engaging with the dough piece D' is forced back until it engages shoulder 164 simultaneously compressing spring 176 and so that its underside is now flush with surrounding bottom surface 104' of the projection 102' with which it then cooperates to press dough piece D' in the tart shell shape illustrated in FIGURE 7 at P' when the two dies are closed to the extent permitted by engagement of their abutment surface 114' and 110'. In said action, dough piece D' is both pressed into the illustrated tart shell shape within crinkle cup C and its surface contracted by push plate 166 and the walls of projection 102' are simultaneously heated and thereby closed to a superficial depth. Therefore, upon withdrawal of die 84' from the lower die cavity 96', the pressed tart shell does not stick to the surface of the projection 102' and push plate 106, but also push plate 166, continues temporarily to engage the bottom of the pressed tart shell under the force of spring 176 until the compression of the spring has been relieved by the raising of die 84' a height sufficient that abutment 172 reengages shoulder 174 wherefor a clean separation of projection 102' from the pressed tart shell P' is obtained.

As in the embodiment of FIGURE 2 the lower die 40 is also provided with a lift plate 142' but which in the FIGURE 5 modification covers the total bottom wall of the cavity. Said lift plate 142' is similarly raised by means of a rod 146 to which it is connected and which depends through provided bore 144 in locating portion 38 of the die 40'. Rod 146 also has a handle 148' attached to its lower end which although illustrated as of slightly different shape than handle 148 in FIGURE 2 is similarly of a diameter less than that of bore 136 so that it can pass therethrough when separating the lower die 40' from its supporting position on arm 32.

As illustrated in FIGURE 2, screw 178 is preferably provided as a permanent part of the reduced end 80 of the rack 54 whereby it is available for use in engaging spring 176 when die 84' is secured to the rack, although it obviously will have no purpose or utility when die 84 is assembled on the lower end of rack 54. It is also to be understood that if desired die 84 might be modified to include push plate 166 in place of push pins 132 and conversely push pins 132 might be used as the release means in die 84' rather than the described push plate 166. Likewise lower die 40 may be modified to permit utilizing lift plate 142' and conveniently lower die 84' may be modified to permit utilizing lift plate 142. Also, in either or both embodiments a crinkle cup or other baking utensil may be first located within the cavity of the lower die so that the dough piece may be pressed into said cooking utensil or crinkle cup.

From the aforesaid description, it will be apparent that all of the recited objects, advantages and features of the invention have been demonstrated as obtainable in a conveniently simple and practical manner, considered both from the use of a press embodying the invention and its manufacture. It will also be recognized that the aforedescribed and illustrated embodiments of the invention are to be taken merely as illustrated and not as limiting the invention since many further changes, modifications and/or rearrangements of the parts comprising the press may be made within the spirit of the described invention and are intended to be encompassed by the appended claims which define my invention.

Thus having described my invention, I claim:

1. A pastry shell press comprising a stand having a pair of vertically spaced horizontally disposed supporting arms, the lower supporting arms including an opening and a first die removably rotatably seated on said lower arm, said first die having a mold cavity on its top side, the upper supporting arm containing a vertically reciprocal member aligned with said first die, a second die adapted for detachable connection to the lower end of said second member, said second die including a projection portion on its underside aligned with the lower die cavity, and means on said upper arm operably connected to the reciprocal member so as to move the same downwardly toward the lower die to carry the projection or the second die into the lower die cavity so as to press a dough piece placed in said cavity into a pastry shell complementing the shape of said cavity and projection, said second die containing a heating element for heating the dough contacting surface of the projection to a temperature at which it simultaneously dries the surface of the dough it contacts in its pressing there, said second die further including a spring loaded member on its underside which engages the pressed dough shell when the two dies are thus brought into pressing relation with the dough, said member temporarily engaging the pressed shell as the upper shell is raised from the lower die so as to hold the pressed shell in the lower die cavity and effect release of the projection from the pressed shell, said member thereafter being raised with the upper die away from the pressed pastry shell.

2. A pastry shell press as claimed in claim 1 wherein said spring-loaded member comprise the bottom wall of the projection portion.

3. A pastry shell press comprising a stand having a pair of vertically spaced horizontally disposed supporting arms, the lower supporting arms including an opening and a first die removably seated on said lower arm having a locating portion on its underside rotatable fitting in said bore, said first die having a mold cavity on its top side, the upper supporting arm containing a vertically reciprocal member aligned with said first die, a second die including a mounting boss on its top side adapted for detachable connection to the lower end of said member by means of a removable lock pin which is passed through aligned through-bores in said die and member, said second die including a projection portion on its underside thereby aligned with the lower die cavity, means on said upper arm operably connected to the reciprocal member to move said die downwardly into the lower die cavity so as to press a dough piece placed in said cavity into a pastry shell complementing the shape of said cavity and projection, said second die having an imperforate dough contacting surface and containing a heating element for heating the dough contacting surface of the projection to a temperature at which it will simultaneously dry the surface of the dough it contacts in its pressing thereof so as to reduce the adhesion of said dough to the projection, said second die further including a member on its underside which engages the pressed dough shell when the two dies are thus brought into pressing relation with the dough, said member being spring-loaded whereby it continues to engage the pressed shell when the upper shell is first raised from the lower die and holds the pressed shell in the lower die cavity to effect release of the projection from the pressed shell, said member thereafter being raised with the upper die away from the pressed pastry shell, the lower die having an elevatable member comprising at least a portion of the bottom wall of its cavity, and operable means extending through a provided vertical bore in the locating portion of said lower die on its underside by which said elevatable member may be raised relative to the surrounding walls of the cavity to effect removal of the pressed pastry shell from the lower die cavity.

References Cited

UNITED STATES PATENTS

| | | | |
|---|---|---|---|
| 2,843,038 | 7/1958 | Manspeaker | 107—1 |
| 756,639 | 4/1904 | Hutchison | 107—15 |
| 3,071,087 | 1/1963 | Kreisky et al. | 107—15 |
| 3,124,083 | 3/1964 | Atwood | 107—15 |

FOREIGN PATENTS

| | | |
|---|---|---|
| 293,536 | 7/1928 | Great Britain. |
| 295,456 | 8/1928 | Great Britain. |

WALTER A. SCHEEL, *Primary Examiner.*

JOSEPH SHEA, *Assistant Examiner.*